(12) United States Patent
Borgen

(10) Patent No.: US 9,587,624 B2
(45) Date of Patent: Mar. 7, 2017

(54) WIND TURBINE ROTOR WITH IMPROVED HUB SYSTEM

(71) Applicant: Sway Turbine, A/S, Bergen (NO)

(72) Inventor: Eystein Borgen, Radal (NO)

( * ) Notice: Subject to any disclaimer, the term of this patent is extended or adjusted under 35 U.S.C. 154(b) by 409 days.

(21) Appl. No.: 14/347,337

(22) PCT Filed: Sep. 26, 2012

(86) PCT No.: PCT/EP2012/068926
§ 371 (c)(1),
(2) Date: Mar. 26, 2014

(87) PCT Pub. No.: WO2013/045474
PCT Pub. Date: Apr. 4, 2013

(65) Prior Publication Data
US 2014/0241889 A1 Aug. 28, 2014

(30) Foreign Application Priority Data

Sep. 26, 2011 (GB) .................................. 1116551.1

(51) Int. Cl.
*F03D 1/06* (2006.01)

(52) U.S. Cl.
CPC ......... *F03D 1/0691* (2013.01); *F03D 1/0658* (2013.01); *F03D 80/70* (2016.05); *F05B 2220/7066* (2013.01); *Y02E 10/721* (2013.01); *Y02E 10/722* (2013.01); *Y02E 10/725* (2013.01)

(58) Field of Classification Search
CPC ...... F03D 1/0691; F03D 1/0658; F03D 80/70; F05B 2220/7066; Y02E 10/722; Y03E 10/721
USPC .............................................. 416/204 R, 174
See application file for complete search history.

(56) References Cited

U.S. PATENT DOCUMENTS

| | | | | |
|---|---|---|---|---|
| 8,911,211 B2 * | 12/2014 | Castell et al. | .......... | F03D 11/02 |
| | | | | 415/124.2 |
| 2008/0226209 A1 * | 9/2008 | Plona | .................... | F01D 21/045 |
| | | | | 384/44 |
| 2013/0287576 A1 * | 10/2013 | Stamps | .................. | B64C 27/48 |
| | | | | 416/174 |

* cited by examiner

*Primary Examiner* — Kevin Lee
(74) *Attorney, Agent, or Firm* — Luedeka Neely Group, P.C.

(57) ABSTRACT

A wind turbine rotor includes a number of blades (5) which are rotatably mounted about an axis of rotation and a number of blade supports (12) each supporting a respective blade (5). Each blade support includes a pair of legs (14) which are spaced apart along the axis of rotation. A pair of hub supports (62) support the legs (14), with the hub supports (62) also being spaced apart along the axis of rotation. The rotor further includes a pair of bearing systems (52), each bearing system being associated with one of the hub supports (62) and each bearing system rotatably supporting its associated hub support so as to allow its associated hub support to rotate about the axis of rotation. Each hub support allows the communication of forces between the blades (5), and each hub support includes at least a pair of radially extending walls (80).

27 Claims, 3 Drawing Sheets

WIND TURBINE ROTOR WITH IMPROVED HUB SYSTEM

FIELD OF THE INVENTION

The invention relates to a wind turbine rotor, and particularly to a wind turbine rotor with an improved hub system. The invention is applicable to both offshore and onshore applications.

BACKGROUND OF THE INVENTION

It is known to position wind turbines both offshore (at sea) and onshore (on land) for the purpose of converting wind energy into other forms of energy, such as electrical energy.

SUMMARY OF THE INVENTION

The invention provides a wind turbine rotor as set out in the accompanying claims.

Embodiments of the invention will now be described, by way of example only, with reference to the accompanying drawings.

DESCRIPTION OF PREFERRED EMBODIMENTS

Figure 1:
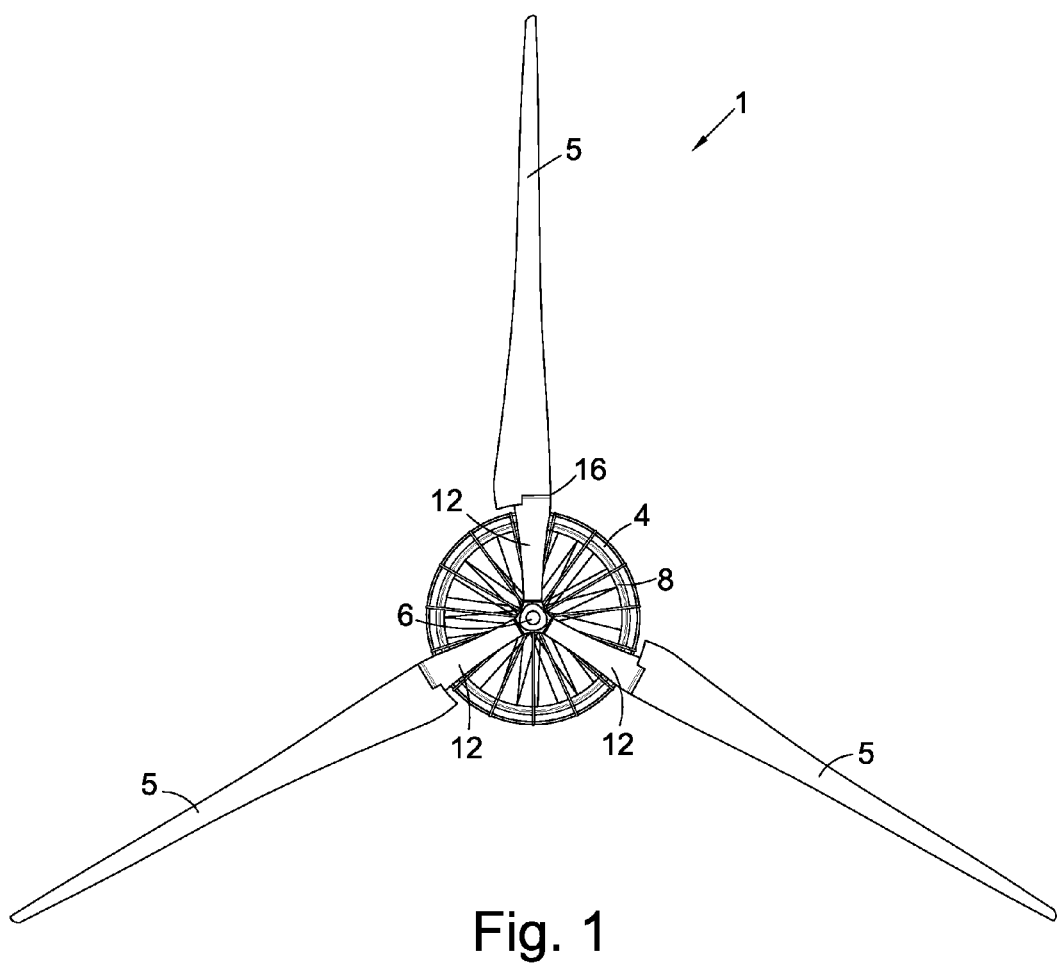
FIG. 1 shows a wind turbine rotor which forms part of a wind turbine.

FIG. 1 shows a wind turbine rotor 1 which is suitable for mounting on a wind turbine tower (not shown). The embodiment described is suitable for large wind turbines which may generate for example 5 to 10 megawatts of electricity, and where the weight of the rotor 1 may for example be in the range of 50 to 400 tonnes (ie. 50,000 to 400,000 Kg).

The main components of the wind turbine rotor 1 are a blade rotor 2, and a generator comprising a generator rotor 4 and a stator 8. The blade rotor 2 comprises three blades 5 which are each supported by a blade support 12 as will be described below.

Figure 2:
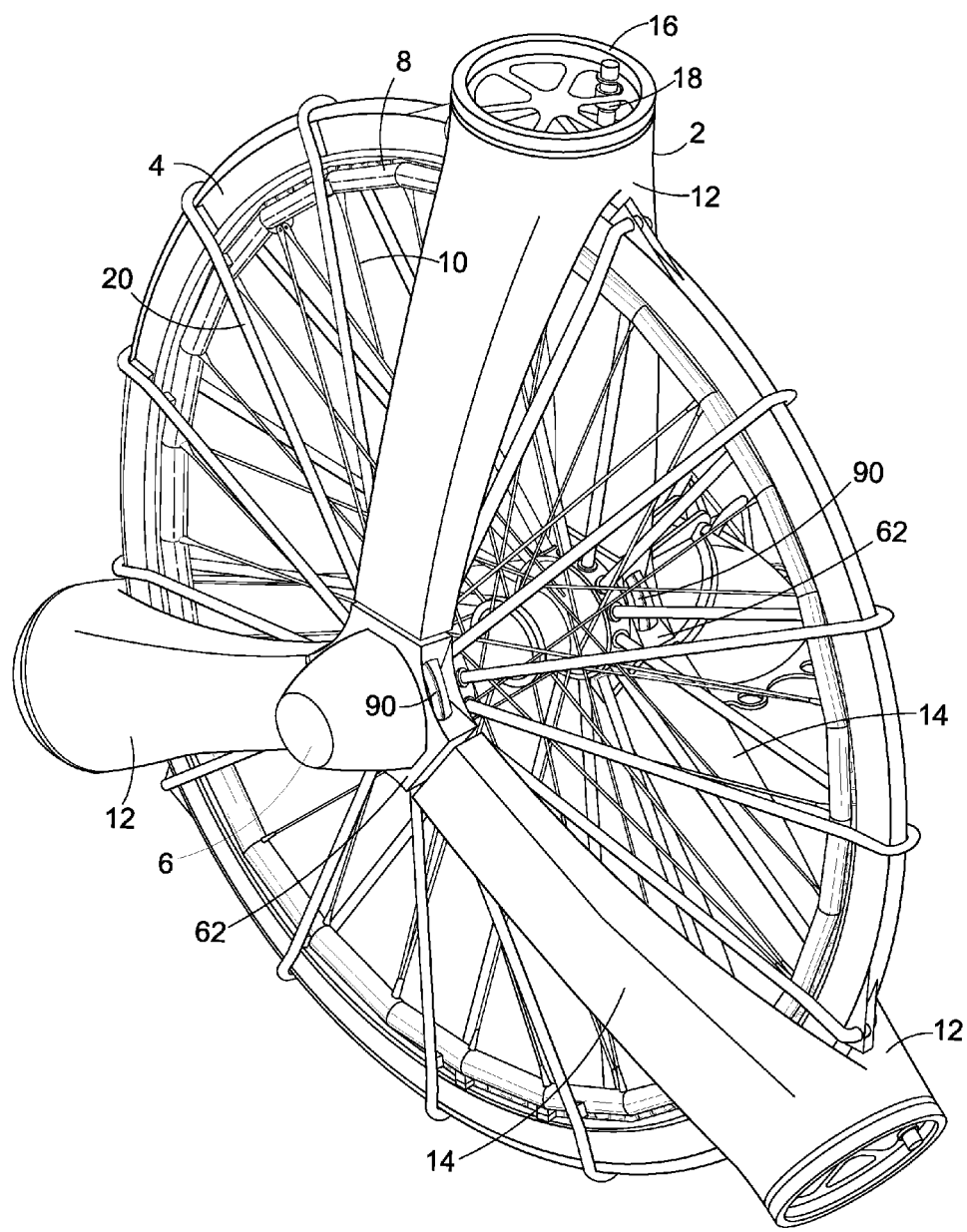
FIG. 2 shows the central part of the wind turbine rotor, and shows three blade supports straddling a generator.

FIG. 2 shows the central part of the wind turbine rotor 1. The blade rotor 2 and the generator rotor 4 are both rotatably mounted on a shaft 6. A stator 8 is supported by spokes 10, and does not rotate about the shaft 6. The generator rotor 4 and the stator 8 together form a generator which generates electricity.

The blade rotor 2 comprises three blades 5 (shown in FIG. 1) which are supported by three blade supports 12. Each blade support 12 has two legs 14 which straddle the generator rotor 4 and the stator 8, and which are rotatably mounted on the shaft 6 at spaced positions.

Each blade support 12 is provided with a pitch bearing 16 which allows a blade 5 attached to the blade support 12 to be rotated by a pitch motor 18. This allows the pitch of each blade 5 to be adjusted to suit the current wind speed and power requirements. In alternative embodiments the pitch bearing 16 can be omitted, and the blades 5 could for example be integrally formed with the blade supports 12.

The generator rotor 4 is supported by a number of supporting members 20, which are arranged as a number of A-frames, and which are rotatably mounted on said shaft 6. The generator rotor 4 carries permanent magnets around its circumference. The stator 8 is provided with electrical windings which are positioned within the magnets of the generator rotor 4. Relative movement between the magnets of the generator rotor 4 and the electrical coils of the stator 8 generates electricity.

Figure 3:
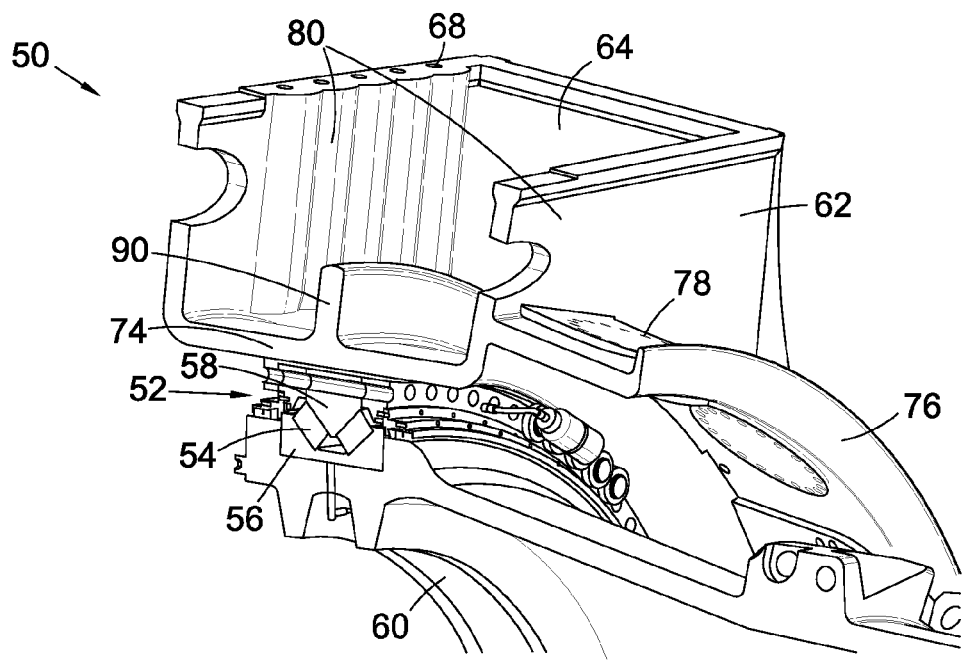
FIG. 3 is a cut-away perspective drawing of part of the hub system at the centre of the wind turbine rotor.

FIG. 3 is a cut-away drawing showing part of the hub system 50 at the centre of the wind turbine rotor 1 shown in FIGS. 1 and 2. A bearing system 52 comprises a number of rollers 54 which sit between an inner bearing ring 56 and an outer bearing ring 58. On the inside of the bearing system 52 there is a central shaft which supports the inner bearing ring 56. Said bearing system 52 may comprise a double tapered roller bearing. A double tapered roller bearing is a bearing which comprises two groups of rollers, each group being arranged in a circle around the axis of rotation, wherein the rollers of each group taper towards or away from the other group.

On the outside of the bearing system 52 there is provided a hub support 62 which supports the blade supports 12 as will be explained in more detail below.

Figure 4:
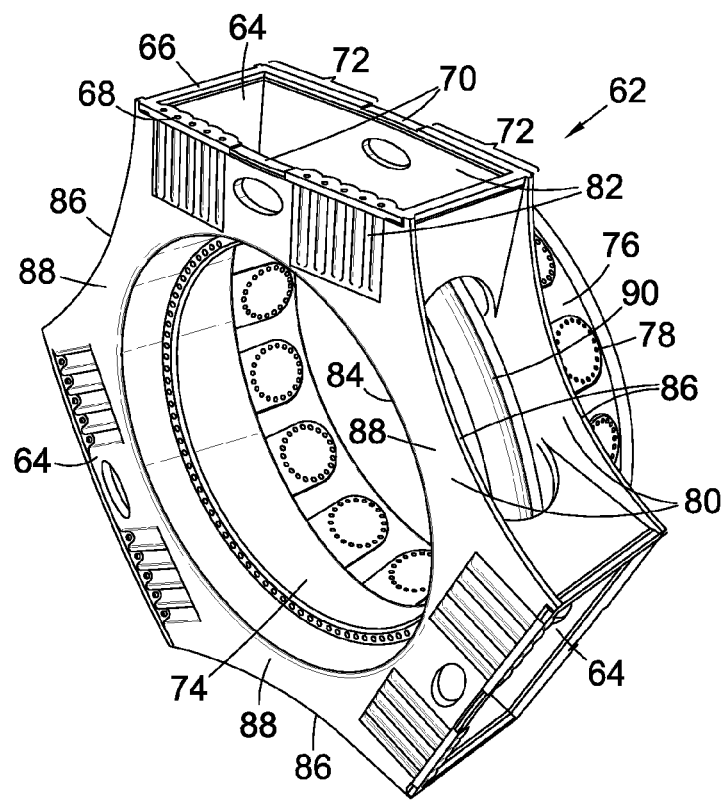
FIG. 4 shows one of the hub supports of the hub system.

FIG. 4 is a perspective view of the whole of the hub support 62 shown in FIG. 3. As shown in FIG. 2, the wind turbine rotor 1 comprises two such hub supports 62 which are spaced apart along the shaft 6 to support the legs 14 of the blade supports 12. Referring to FIG. 4, each hub support 62 comprises three box sections 64 which are shaped to support the legs 14 of the blade supports 12. Each box section 64 has a rectangular rim 66 provided with bolt holes 68 to which the legs 14 are bolted. Each rectangular rim 66 is provided with two lowered or recessed central areas 70 at the centre of the longitudinal edges, these recessed areas 70 ensure that loads applied by the legs 14 are taken by the two end portions 72 of the rectangular rim 66, and not by the central areas 70 of the rectangular rim 66, as will be explained further below.

Additionally or alternatively a hole 73 may be formed in each of the longitudinal walls 82 shown in FIG. 4, to achieve the same effect, ie to avoid forces from the legs 14 being fed directly into the bearing, but rather to lead the forces around the bearing to the next blade support. As will be explained below, each hub support 62 comprises two radially projecting walls 80, which also form the longitudinal walls 82 of each of the three box sections 64. In this embodiment the holes 73 are oval shaped, and each hole 73 is positioned in the centre of one of the longitudinal walls 82, below a corresponding recessed area 70. By tuning the shape and the size of the holes 73 an optimum distribution of forces and deflections in the hub support 62 can be found. It will be appreciated that the holes 73 can be much larger than, and/or have a different shape from, the holes 73 shown in FIG. 4.

Still referring to FIG. 4, it can be seen that the whole of the hub support 62 is integrally formed, and includes a central cylindrical portion 74 within the three box sections 64, and a projecting cylindrical flange 76 which projects to one side of the box sections 64. The projecting cylindrical flange 76 is formed with bolt holes 78 arranged in a number of circles, thus allowing the supporting members 20 (of the A-frames) shown in FIG. 2 to be bolted thereto. Thus in this embodiment the blade rotor and the generator rotor share the same bearing, namely the bearing system 52. The central cylindrical portion 74 sits around, and is supported by, the outer bearing ring 58 shown in FIG. 3.

From FIG. 4 it can be seen that each hub support 62 comprises two radially projecting walls 80, each wall 80 lying in a plane which is substantially perpendicular to the central rotational axis of the hub system 50. The walls 80 also provide and form the longitudinal walls 82 of each of the three box sections 64. The central cylindrical portion 74 defines a circular aperture 84 in the centre of each wall 80. In addition, the outer edge of each wall 80 has the shape of a concave circular (or generally circular) arc 86 in the region between each of the three box sections 64. This ensures that, when large forces are applied to the end portions 72, the three regions 88 of each wall 80 between the three box sections 64 do not ovalise or otherwise deform during use because the generally symmetrical shape of each region 88 ensures that each region 88 is balanced, ie does not know which way to deform. The arcs 86 have the additional advantage of using less material for the hub support 62, also making it lighter.

As shown most clearly in FIG. 3, the central cylindrical portion 74 is provided with an outwardly projecting ring or flange 90, which extends around the outside of the cylindrical portion 74. In this embodiment the flange 90 is integrally formed with the cylindrical portion 74. In other embodiments the flange 90 could be a separate component, attached to the cylindrical portion 74, or the flange 90 could be omitted. The flange 90 has a generally flat shape, with an elongate cross-section, and lies generally in a plane which is perpendicular to the axis of rotation of the hub support 62. The flange 90 is positioned midway, or generally midway, between the two walls 80.

The operation of the hub system 50 will now be described. During operation of the wind turbine rotor 1 large wind forces may act on the blades 5 which will usually cause the three legs 14 on one side of the rotor 1 to be in compression and the three legs 14 on the other side of the rotor 1 to be under tension. The forces acting on each leg 14 may be very large, and can cause large forces of for example 500 tonnes at the base of each leg 14. In the absence of the hub support 62 described above these large forces would immediately crush or rip apart the bearing system 52.

However, the hub support 62 allows the forces from each leg 14 to be communicated, through the regions 88 of the walls 80, so that in the ideal case, with a steady wind, the (compression or tension) forces from each of the three legs 14 cancel each other out, in which case the resulting force on the outer bearing ring 58 is zero if the gravity forces are disregarded. Even if the resultant force is not zero, it will be significantly reduced as a result of communication of the forces through the walls 80.

It is important for the operation of the bearing system 52 that the outer bearing ring 58 does not suffer distortion as a result of the very large forces acting on the legs 14. In addition to the communication of forces through the walls 80 described above, there are other features of the hub system 50 which prevent or minimise such distortion. Firstly the two walls 80 are spaced apart, as shown in FIG. 3, with the outer bearing ring 58 position midway between them. This keeps the walls 80 a certain distance away from the outer bearing ring 58 so that any small distortions of the walls 80 are not transmitted directly to the outer bearing ring 58. Secondly, the central cylindrical portion 74 between the two walls 80 has a degree of flexibility which absorbs any movement or distortion of the walls 80 so that the outer bearing ring 58 is not directly affected. The hub support 62 is integrally formed from steel, which is very resistant to forces of compression and tension (ie in the case of the walls 80), but which has a degree of lateral flexibility (ie in the case of the central cylindrical portion 74).

It will be appreciated that because the two legs 14 of each blade support 12 are spaced apart along the rotational axis, the blade supports 12 have a very strong resistance to bending moments caused by forces on the blades 5. However it is still possible for forces to arise which create a bending moment on each individual hub support 62. Such bending moments seek to twist the hub support 62 about a tangential axis, ie an axis which is tangential to the outer bearing ring 58, and such twisting would be very bad for the operation of the bearing system 52. The flexible central cylindrical portion 74 is able to take up some of such twisting, thus reducing the effect on the outer bearing ring 58. To improve the twisting (torsional) stability of the hub support 62, the area between the walls 80 may be closed, or partially closed, by incorporating a plate (not shown) which can be bolted, bonded or welded to the edges of the walls 80 forming the arcs 86, to form a torsionally stiff box structure between the box sections 64. Alternatively such plates could be integrally form with, and cast with, the remainder of the hub support 62.

The flange 90 acts as a stiffener ring and ensures that the cylindrical portion 74 of the hub support 62 is kept stiff locally at the contact area with the outer bearing ring 58, thus avoiding ovalization, or other deformation, of the cylindrical portion 74 of the hub support 62 directly over the outer bearing ring 58. The cylindrical portion 74 of the hub support 62 on either side of the flange 90 remains flexible, as described above. However, the flange 90 acts as a stiffener ring will further reduces the risk of losing contact locally between the outer bearing ring 58 and the hub support 62.

In summary we can say that the stiff outer walls 80 carry and communicate the high radial loads around the bearing system 52, a relatively flexible or "soft" central pipe portion (ie cylindrical portion 74) arranged at 90 degrees to the walls 80 distributes the net resolved load to the bearing system 52, and the stiff flange 90 of the hub support 62 just around the outer bearing ring 58 ensures a good fit around the outer bearing ring 58 and avoids loss of contact with the outer bearing ring 58 due to ovalisation or local deflections of the cylindrical "pipe" portion 74.

Various variations are possible. For example, the hub support 62 does not have to be integrally formed. The walls 80, for example, do not have to be integrally formed with the central cylindrical portion 74. The hub support 62 can be formed from metal, such as steel, or can be formed from a composite material.

Although the preferred embodiment uses magnets on the generator rotor and electrical windings on the stator, it is possible to reverse these and use electrical windings on the generator rotor and magnets on the stator. This option is generally less preferred as it would require slip rings on the generator rotor to conduct the generated electricity away from the generator rotor.

The invention may provide a wind turbine rotor comprising a number of blades which are rotatably mounted about an axis of rotation;

a number of blade supports, each blade support supporting a respective blade and each blade support having a pair of legs which are spaced apart along said axis of rotation;

a pair of hub supports which support said legs, with said hub supports also being spaced apart along said axis of rotation; and a pair of bearing systems, each bearing system being associated with one of said hub supports and each bearing system rotatably supporting its associated hub support so as to allow its associated hub support to rotate about said axis of rotation;

wherein each hub support allows the communication of forces between said blades.

The invention claimed is:

1. A wind turbine rotor comprising:
a number of blades which are rotatably mounted about an axis of rotation;
a number of blade supports, each blade support supporting a respective blade and each blade support having a pair of legs which are spaced apart along said axis of rotation;
a pair of hub supports which support said legs, with said hub supports also being spaced apart along said axis of rotation; and
a pair of bearing systems, each bearing system being associated with one of said hub supports and each bearing system rotatably supporting its associated hub support so as to allow its associated hub support to rotate about said axis of rotation;
wherein each hub support allows the communication of forces between said blades, and each hub support comprises at least a pair of radially extending walls.

2. The wind turbine as claimed in claim 1, wherein each of said walls lies generally in a plane which is perpendicular to said axis of rotation.

3. The wind turbine as claimed in claim 1, wherein each of said bearing systems is positioned between said pair of walls of its associated hub support.

4. The wind turbine as claimed in claim 3, wherein each of said bearing systems is positioned half way between said pair of walls of its associated hub support.

5. The wind turbine as claimed in claim 1, wherein at least a portion of an outer edge of each of said walls has a shape of a concave arc.

6. The wind turbine as claimed in claim 5, wherein said arc is part of a circle.

7. The wind turbine as claimed in claim 6, wherein each of said walls has a central circular aperture and the radius of said central circular aperture is substantially the same as the radius of said arc.

8. The wind turbine as claimed in claim 1, wherein each of said walls is provided with connection portions adapted to connect, directly or indirectly, to said legs, and wherein each of said walls is provided with at least one region between said connection portions which has a generally symmetrical shape so as to resist distortion when forces are applied to said hub support by said legs.

9. The wind turbine as claimed in claim 1, wherein each hub support comprises a cylindrical structure between said pair of walls of the hub support.

10. The wind turbine as claimed in claim 9, wherein at least one of said bearing systems is mounted to said cylindrical structure.

11. The wind turbine as claimed in claim 9, wherein said cylindrical structure has sufficient flexibility to prevent damage to said bearing system in the event of distortion of said walls during use.

12. The wind turbine as claimed in claim 9, wherein said cylindrical structure is provided with a stiffener ring.

13. The wind turbine as claimed in claim 12, wherein said stiffener ring is positioned substantially midway between said pair of radially extending walls.

14. The wind turbine as claimed in claim 12, wherein said stiffener ring is a flange which is integrally formed with said cylindrical structure.

15. The wind turbine as claimed in claim 12, wherein said cylindrical structure and said stiffener ring are concentrically arranged about said axis of rotation.

16. The wind turbine as claimed in claim 12, wherein said stiffener ring extends around said cylindrical structure directly above an associated one of said pair of bearing systems, so as to prevent deformation of said cylindrical structure in the area of the associated bearing system.

17. The wind turbine as claimed in claim 1, wherein each said pair of walls also forms two opposite walls of a box for supporting one of said legs.

18. The wind turbine as claimed in claim 17, wherein said box has a rim arranged to support one of said legs, and at least one recess is provided in a central part of said rim so that forces from said leg are not communicated to said central part of said rim.

19. The wind turbine as claimed in claim 1, wherein said bearing system acts as a bearing system for both said blades and blade supports and also for a generator rotor arranged to be driven by rotational torque from said blades to produce electricity.

20. The wind turbine as claimed in claim 19, wherein said hub support is provided with support means for supporting radial supporting members of said generator rotor.

21. The wind turbine as claimed in claim 1, wherein said hub support is integrally formed.

22. The wind turbine as claimed in claim 1, wherein said hub support is formed of metal.

23. The wind turbine as claimed in claim 1, wherein each blade is integrally formed with its respective blade support.

24. The wind turbine as claimed in claim 1, wherein each hub support is integrally formed with said blade supports.

25. The wind turbine as claimed in claim 1, wherein said bearing system of each hub support consists of a bearing system which can carry out of plane bending moments, axial forces and radial forces simultaneously.

26. The wind turbine as claimed in claim 1, wherein said bearing system of each hub support comprises a number of rollers which sit between an inner bearing ring and an outer bearing ring.

27. The wind turbine as claimed in claim 1, wherein said bearing system of each hub support comprises a double tapered roller bearing.

* * * * *